United States Patent
Demmon et al.

(10) Patent No.: US 9,031,065 B2
(45) Date of Patent: May 12, 2015

(54) SWITCH HAVING DEDICATED STACKING LINK

(75) Inventors: Nick E. Demmon, Roseville, CA (US); Sundeep S Nagra, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 164 days.

(21) Appl. No.: 13/453,373

(22) Filed: Apr. 23, 2012

(65) Prior Publication Data

US 2013/0279502 A1 Oct. 24, 2013

(51) Int. Cl.
*H04L 12/775* (2013.01)
*H04L 12/927* (2013.01)
*H04L 12/931* (2013.01)

(52) U.S. Cl.
CPC .............. *H04L 49/354* (2013.01); *H04L 49/70* (2013.01); *H04L 49/45* (2013.01)

(58) Field of Classification Search
CPC ... H04L 45/00; H04L 45/583; H04L 41/0816; H04L 49/253; H04L 12/50; H04L 45/586; H04L 49/90; H04L 49/70
USPC .................................. 370/221, 223, 386, 406
See application file for complete search history.

(56) References Cited

U.S. PATENT DOCUMENTS

| | | | |
|---|---|---|---|
| 6,414,958 B1 | 7/2002 | Specht | |
| 6,532,088 B1* | 3/2003 | Dantu et al. | 398/43 |
| 6,785,272 B1* | 8/2004 | Sugihara | 370/386 |
| 6,854,015 B2 | 2/2005 | McCormack et al. | |
| 6,952,396 B1* | 10/2005 | Cottreau et al. | 370/222 |
| 7,295,552 B1* | 11/2007 | Kadambi et al. | 370/392 |
| 7,466,653 B1 | 12/2008 | Cohen et al. | |
| 7,593,320 B1 | 9/2009 | Cohen et al. | |
| 7,756,015 B1 | 7/2010 | Bishara et al. | |
| 7,907,518 B2 | 3/2011 | Kuhl et al. | |
| 2006/0146697 A1* | 7/2006 | Magret et al. | 370/219 |
| 2007/0025362 A1* | 2/2007 | Jorgensen | 370/400 |
| 2007/0230368 A1* | 10/2007 | Shi et al. | 370/254 |
| 2008/0301319 A1* | 12/2008 | Dernosek et al. | 709/232 |
| 2009/0268748 A1* | 10/2009 | Ghaibeh et al. | 370/419 |
| 2009/0310610 A1* | 12/2009 | Sandstrom | 370/392 |
| 2011/0080829 A1 | 4/2011 | Breslin et al. | |
| 2011/0110369 A1* | 5/2011 | Shiraki | 370/389 |
| 2011/0194404 A1* | 8/2011 | Kluger et al. | 370/218 |
| 2011/0305245 A1* | 12/2011 | Tanaka et al. | 370/401 |

* cited by examiner

*Primary Examiner* — Ahmed Elallam
(74) *Attorney, Agent, or Firm* — Dicke, Billig & Czaja (57) ABSTRACT

A first switch includes a processor and a memory communicatively coupled to the processor. The memory stores instructions causing the processor, after execution of the instructions by the processor, to establish a first stacking link between a first stacking port of the first switch and a first stacking port of a second switch, establish a second stacking link between a second stacking port of the first switch and a first stacking port of a third switch, and dedicate the first stacking link to a first class of traffic between the first switch and the second switch.

7 Claims, 6 Drawing Sheets

SWITCH HAVING DEDICATED STACKING LINK

BACKGROUND

One type of network switch for routing communications over a network between devices, such as servers and clients, is a switch that can be stacked. A switch that can be stacked is fully functional operating standalone but may also be configured to operate in combination with one or more other switches that can be stacked. When configured to operate in combination with one or more other switches, the group of switches acts as a single switch with an increased port capacity.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined with each other, unless specifically noted otherwise.

Figure 1:
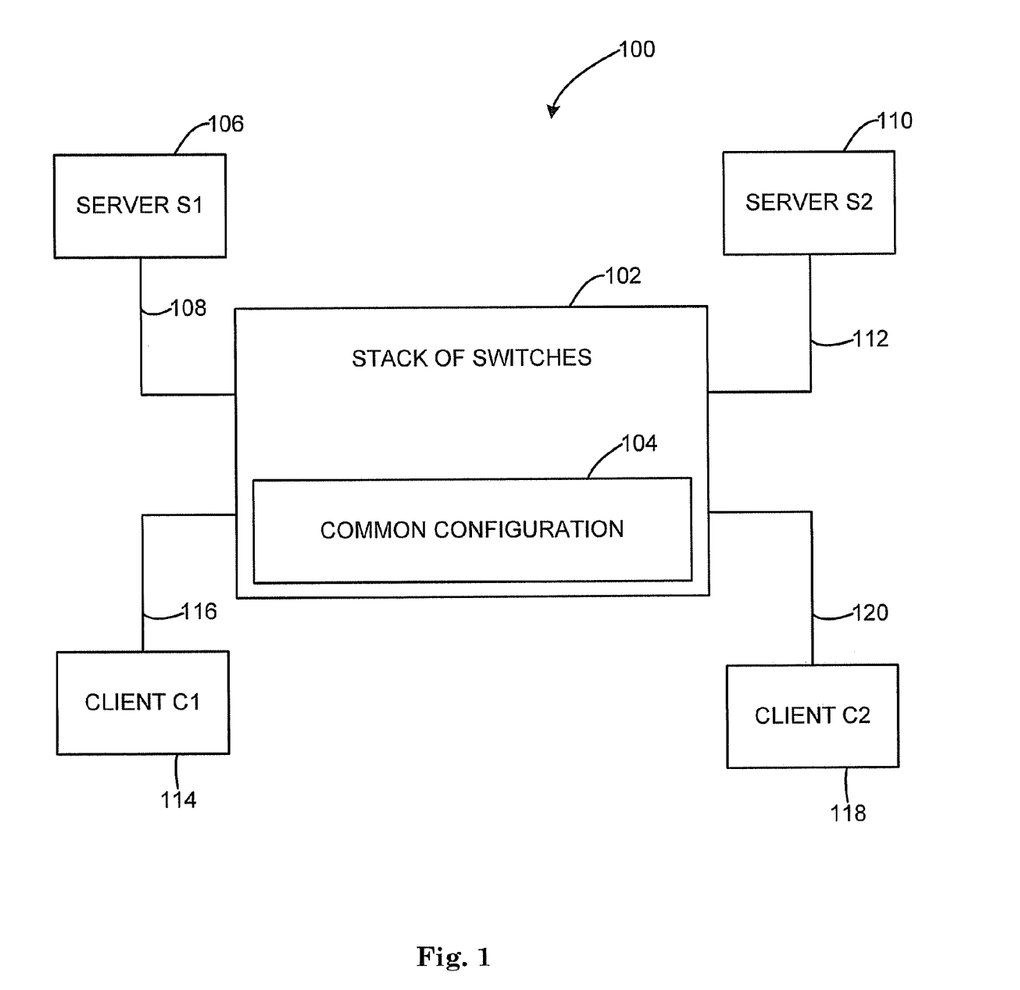
FIG. 1 is a block diagram illustrating one example of a system including a stack of switches.

FIG. 1 is a block diagram illustrating one example of a system 100 including a stack of switches (stack) 102. System 100 includes a first server (S1) 106, a second server (S2) 110, a first client (C1) 114, and a second client (C2) 118. In other examples, system 100 includes any suitable number of servers, clients, or other devices. First server 106 is communicatively coupled to stack 102 through communication link 108. Second server 110 is communicatively coupled to stack 102 through communication link 112. First client 114 is communicatively coupled to stack 102 through communication link 116. Second client 118 is communicatively coupled to stack 102 through communication link 120. In one example, communication links 108, 112, 116, and 120 are Ethernet communication links.

Stack 102 routes communications between first sever 106, second server 110, first client 114, and second client 118. Stack 102 includes a plurality of switches in either a dual ring topology or a mesh topology. In one example, for the mesh topology, stack 102 includes a dedicated stacking link between two of the switches for routing communications between the two switches. In another example, for the dual ring topology, stack 102 routes a first class of communications over one of the two rings and a second class of communications over the other one of the two rings.

As used herein, the term "stacking link" is defined as a link between two switches that is configured to pass traffic and control data between the two switches with the purpose of creating a stack that acts and is managed like a single switch.

Stack 102 includes common configuration data 104 that specifies the topology of the stack and whether specified stacking links are dedicated to particular classes of traffic between the switches of the stack. Common configuration data 104 is distributed to each switch within stack 102. The particular classes of traffic between the switches may be defined as all traffic directly between two of the switches, a particular Virtual Routing and Forwarding (VRF) instance, a particular set of ports, a particular Virtual Local Area Network (VLAN), a particular set of protocols, voice traffic, video traffic, or any other suitable type of traffic.

In one example, based on common configuration data 104, stack 102 routes traffic between first client 114 and second server 110 over a first set of stacking links within stack 102, and routes traffic between second client 118 and first server 106 over a second set of stacking links within stack 102 separate from the first set. In this way, if traffic over the first set of stacking links saturates the available bandwidth of the first set, the second set of stacking links is not adversely impacted. Thus, stack 102 enables a specific amount of inter-switch bandwidth to be dedicated to a particular use.

Figure 2:
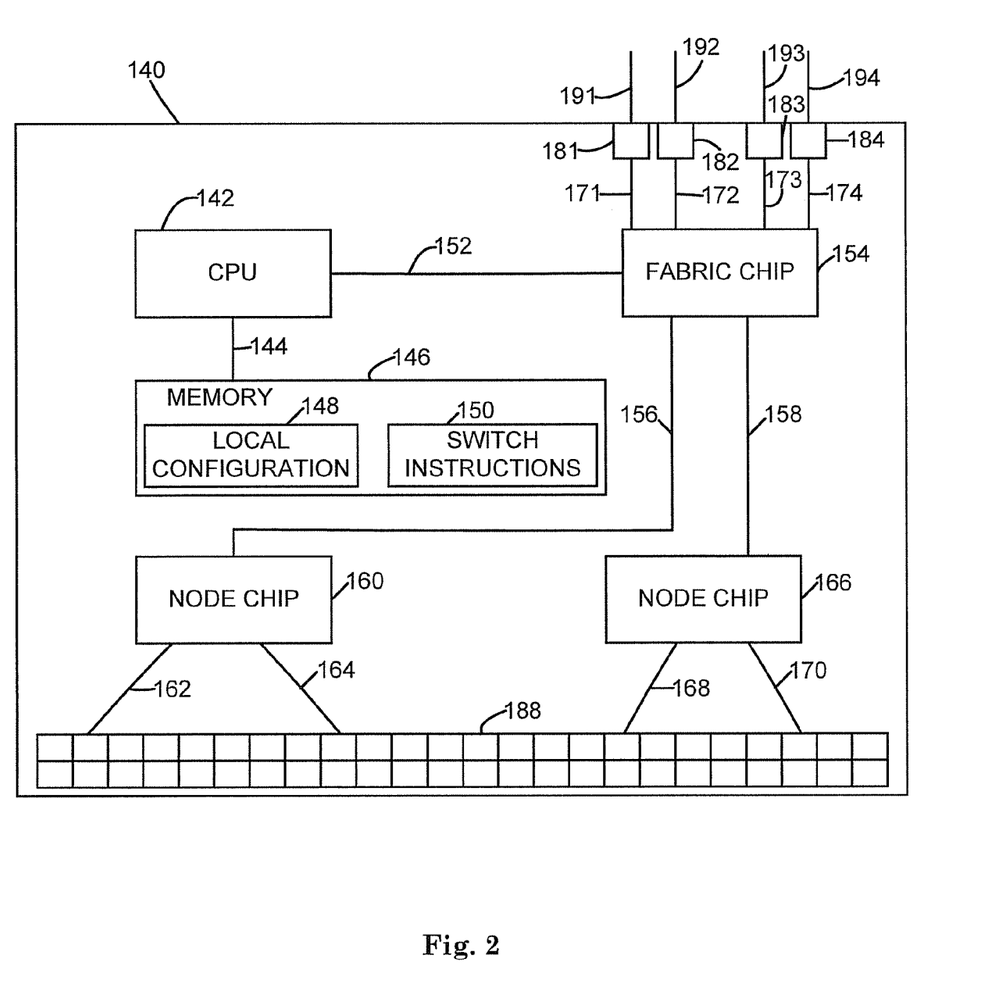
FIG. 2 is a block diagram illustrating one example of a single switch for use in a stack of switches.

FIG. 2 is a block diagram illustrating one example of a single switch 140 for use in a stack of switches. In one example, stack 102 previously described and illustrated with reference to FIG. 1 includes two or more switches 140. Switch 140 includes a Central Processing Unit (CPU) 142, a memory 146, a fabric chip 154, node chips 160 and 166, a plurality of ports 188, and four stacking ports 181-184. In one example, stacking ports 181-184 are connected to other physical devices to create the stack.

CPU 142 is communicatively coupled to memory 146 through communication link 144. CPU 142 is communicatively coupled to fabric chip 154 through communication link 152. Fabric chip 154 is communicatively coupled to node chip 160 through communication link 156 and to node chip 166 through communication link 158. Node chip 160 is communicatively coupled to a first portion of the plurality of ports 188 through communication link 162 and to a second portion of the plurality of ports 188 through communication link 164. Node chip 166 is communicatively coupled to a third portion of the plurality of ports 188 through communication link 168 and to a fourth portion of the plurality of ports 188 through communication link 170.

Fabric chip 154 is communicatively coupled to a first stacking port 181 through communication link 171. Fabric chip 154 is communicatively coupled to a second stacking port 182 through communication link 172. Fabric chip 154 is communicatively coupled to a third stacking port 183 through communication link 173. Fabric chip 154 is communicatively coupled to a fourth stacking port 184 through communication link 174.

In one example, first stacking port 181 is communicatively coupled to another switch (not shown) through stacking link 191. Second stacking port 182 is communicatively coupled to another switch (not shown) through stacking link 192. Third stacking port 183 is communicatively coupled to another switch (not shown) through stacking link 193. Fourth stacking port 184 is communicatively coupled to another switch (not shown) through stacking link 194. In one example, for a mesh topology, each stacking port 181-184 is communicatively coupled to a different switch. In another example, for a dual ring topology, two of the stacking ports 181-184 are communicatively coupled to a first switch, and the other two of the stacking ports 181-184 are communicatively coupled to a second switch.

In one example, memory 146 stores switch instructions 150 executed by CPU 142 for operating switch 140. Memory 146 includes any suitable combination of volatile and/or non-volatile memory, such as combinations of Random Access Memory (RAM), Read-Only Memory (ROM), flash memory, and/or other suitable memory. Memory 146 also stores local configuration data 148 for configuring switch 140. In one example, local configuration data 148 is a copy of common configuration data 104 previously described and illustrated with reference to FIG. 1. In one example, local configuration data 148 specifies the particular class of traffic that will be routed through each stacking link 191-194.

Fabric chip 154 routes communications (e.g. Ethernet packets) between stacking ports 181-184 and node chips 160 and 166 based on destination addresses of the communications. Node chips 160 and 166 route communications between fabric chip 154 and the plurality of ports 188. In one example, each of the plurality of ports 188 is an RJ 45 port. Each of the plurality of ports 188 may be communicatively coupled to a device that communicates over the network via switch 140, such as a server, a client, or another suitable device. In operation, switch 140 routes communications between the plurality of ports 188 and stacking ports 181-184 based on the destination addresses of the communications and local configuration data 148.

Figure 3:
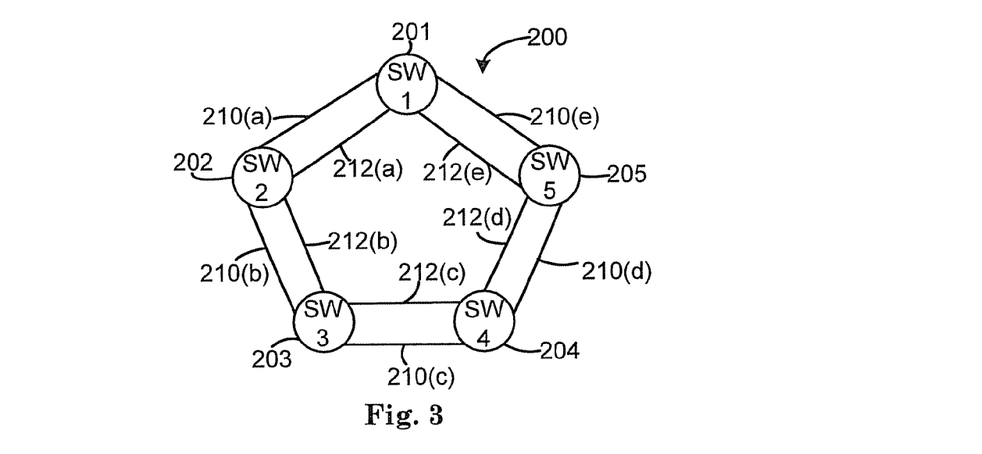
FIG. 3 is a block diagram illustrating one example of a stack having a dual ring topology.

FIG. 3 is a block diagram illustrating one example a stack 200 having a dual ring topology. Stack 200 includes a first switch 201, a second switch 202, a third switch 203, a fourth switch 204, and a fifth switch 205. In other examples, stack 200 includes another suitable number of switches, such as six, seven, eight, nine, or ten. In one example, each switch 201-205 is similar to switch 140 previously described and illustrated with reference to FIG. 2.

Each switch 201-205 includes four stacking ports (e.g., stacking ports 181-184 previously described and illustrated with reference to FIG. 2) for communicatively coupling each switch to other switches of stack 200 via stacking links. A first stacking port and a second stacking port of first switch 201 is communicatively coupled to a first stacking port and a second stacking port of second switch 202 through a first stacking link 210(a) and a second stacking link 212(a), respectively. A third stacking port and a fourth stacking port of second switch 202 is communicatively coupled to a first stacking port and a second stacking port of third switch 203 through a first stacking link 210(b) and a second stacking link 212(b), respectively.

A third stacking port and a fourth stacking port of third switch 203 is communicatively coupled to a first stacking port and a second stacking port of fourth switch 204 through a first stacking link 210(c) and a second stacking link 212(c), respectively. A third stacking port and a fourth stacking port of fourth switch 204 is communicatively coupled to a first stacking port and a second stacking port of fifth switch 205 through a first stacking link 210(d) and a second stacking link 212(d), respectively. A third stacking port and a fourth stacking port of fifth switch 205 is communicatively coupled to a third stacking port and a fourth stacking port of first switch 201 through a first stacking link 210(e) and a second stacking link 212(e), respectively.

Stacking links 210(a)-210(e), commonly referred to herein as stacking links 210, provide a first or outer ring of the dual ring topology. Stacking links 212(a)-212(e), commonly referred to herein as stacking links 212, provide a second or inner ring of the dual ring topology. In one example, a first class of communications are routed between switches 201-205 via the outer ring stacking links 210, and a second class of communications are routed between switches 201-205 via the inner ring stacking links 212. By specifying the class of communications to be routed through each ring, the available bandwidth of each ring can be efficiently managed.

In the dual ring topology, if one of the stacking links between the switches in either the outer ring or the inner ring is broken, communications can still reach each switch in both the outer ring and the inner ring. For example, if stacking link 210(a) is broken, communications can still be routed on the outer ring between first switch 201 and second switch 202 via stacking links 210(e), 210(d), 210(c), and 210(b).

If two of the stacking links between the switches in either the outer ring or the inner ring are broken, communications can still be routed on the other ring. For example, if stacking links 210(a) and 210(d) are broken, communications between second switch 202 and fifth switch 205 can still be routed via stacking links 212(b), 212(c), and 212(d) or via stacking links 212(a) and 212(e). Therefore, the dual ring topology of stack 200 not only allows specific traffic to be routed either through the outer ring or the inner ring, but also adds additional redundancy to stack 200 compared to a single ring topology. This capability of redundancy is configurable, such that a user may choose whether or not traffic from a failed ring is transferred to the other ring.

Figure 4:
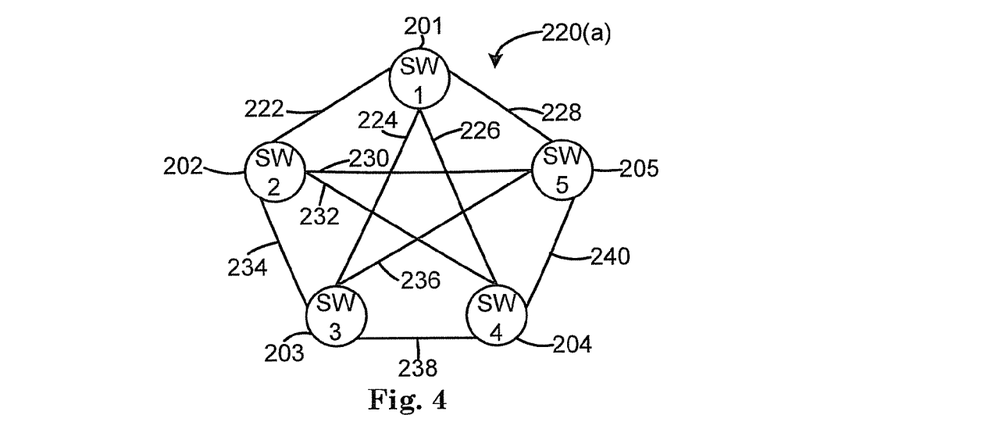
FIG. 4 is a block diagram illustrating one example of a stack having a mesh topology.

FIG. 4 is a block diagram illustrating one example of a stack 220(a) having a mesh topology. Stack 220(a) includes a first switch 201, a second switch 202, a third switch 203, a fourth switch 204, and a fifth switch 205. In other examples, stack 220(a) includes three or four switches. In one example, each switch 201-205 is similar to switch 140 previously described and illustrated with reference to FIG. 2.

Each switch 201-205 includes four stacking ports (e.g., stacking ports 181-184 previously described and illustrated with reference to FIG. 2) for communicatively coupling each switch to each of the other switches of stack 220(a) via stacking links. A first stacking port of first switch 201 is communicatively coupled to a first stacking port of second switch 202 through a stacking link 222. A second stacking port of first switch 201 is communicatively coupled to a first stacking port of third switch 203 through a stacking link 224. A third stacking port of first switch 201 is communicatively coupled to a first stacking port of fourth switch 204 through a stacking link 226. A fourth stacking port of first switch 201 is communicatively coupled to a first stacking port of fifth switch 205 through a stacking link 228.

A second stacking port of second switch 202 is communicatively coupled to a second stacking port of third switch 203 through a stacking link 234. A third stacking port of second switch 202 is communicatively coupled to a second stacking port of fourth switch 204 through a stacking link 232. A fourth stacking port of second switch 202 is communicatively coupled to a second stacking port of fifth switch 205 through a stacking link 230.

A third stacking port of third switch 203 is communicatively coupled to a third stacking port of fourth switch 204 through a stacking link 238. A fourth stacking port of third switch 203 is communicatively coupled to a third stacking port of fifth switch 205 through a stacking link 236. A fourth stacking port of fourth switch 204 is communicatively coupled to a fourth stacking port of fifth switch 205 through a stacking link 240.

In one example, one or more of the stacking links 222, 224, 226, 228, 230, 232, 234, 236, 238, and 240 may be dedicated to a particular class of traffic between two of the switches 201-205. By specifying the class of communications to be routed through a stacking link, the available bandwidth of each stacking link can be efficiently managed. For example, stacking link 228 may be dedicated to traffic between first switch 201 and fifth switch 205, and stacking link 230 may be dedicated to traffic between second switch 202 and fifth switch 205. Therefore, traffic between first switch 201 and fourth switch 204 is not routed over stacking link 228 or 230.

Figure 5:
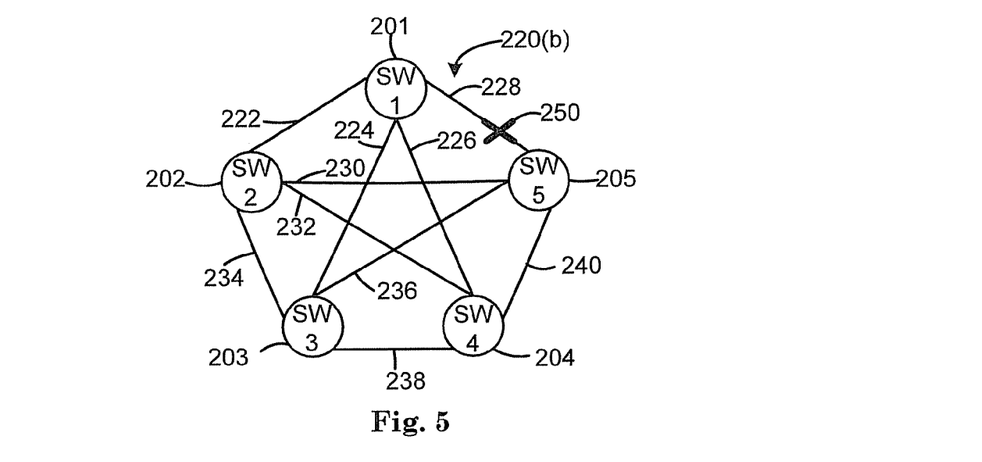
FIG. 5 is a block diagram illustrating one example of the stack of FIG. 4 with a broken stacking link.

FIG. 5 is a block diagram illustrating one example of the stack of FIG. 4 with a broken stacking link. Stack 220(b) is similar to stack 220(a), except that stack 220(b) includes a broken stacking link 228, as indicated at 250. In this example, stacking link 228 is dedicated to traffic between first switch 201 and fifth switch 205, and stacking link 230 is dedicated to traffic between second switch 202 and fifth switch 205. With stacking link 228 broken, traffic between first switch 201 and fifth switch 205 will not be routed over dedicated stacking link 230. Instead, traffic between first switch 201 and fifth switch 205 will be routed over stacking links 226 and 240 or over stacking links 224 and 236. Therefore, the traffic between second switch 202 and fifth switch 205 over dedicated stacking link 230 is not adversely affected by broken stacking link 228.

Figure 6:
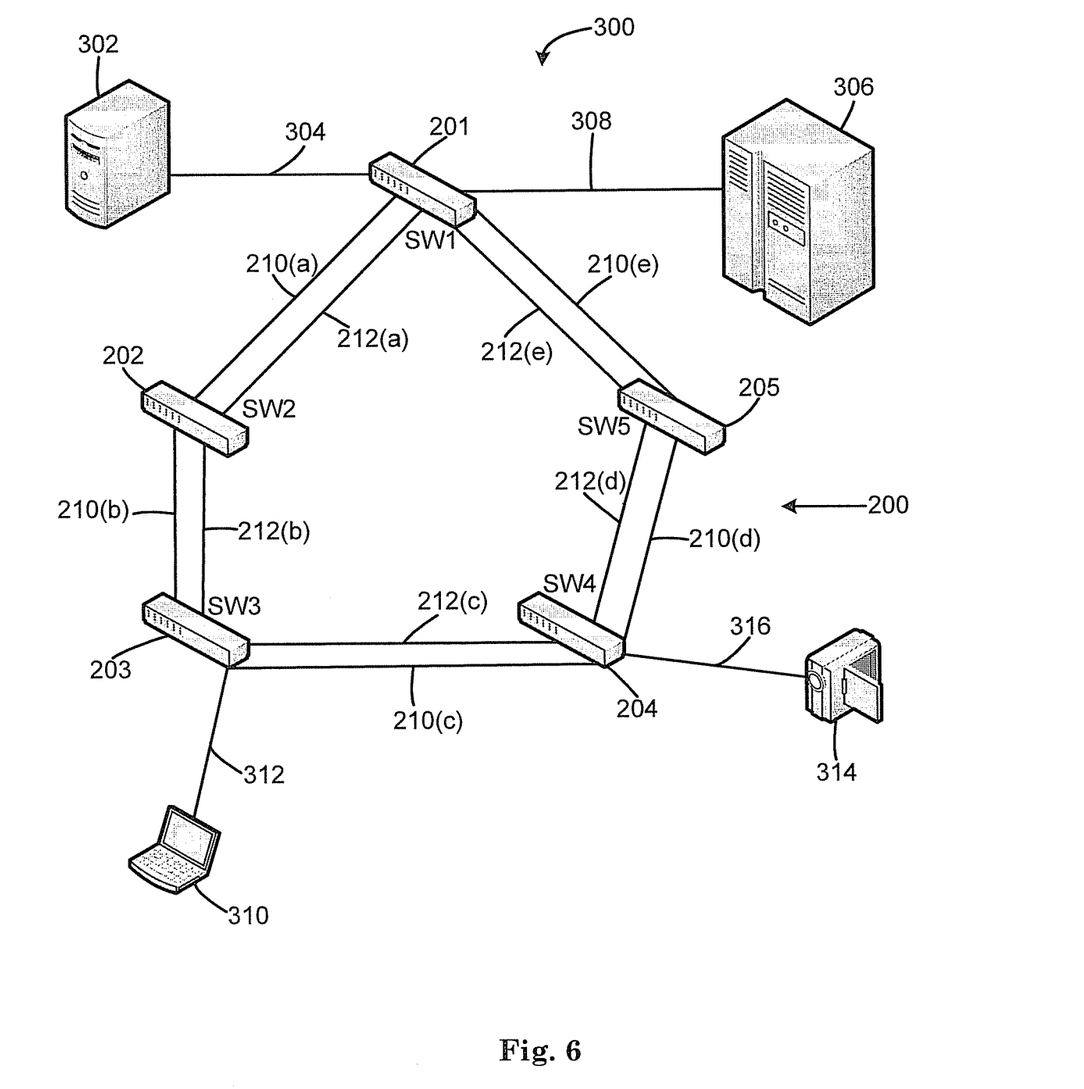
FIG. 6 is a block diagram illustrating one example of a system including a stack having a dual ring topology.

FIG. 6 is a block diagram illustrating one example of a system 300 including a stack having a dual ring topology. System 300 includes stack 200 previously described and illustrated with reference to FIG. 3. System 300 also includes a video server 302, a file server 306, a laptop computer 310, and a video camera 314.

Video server 302 is communicatively coupled to a port (e.g., one of ports 188 previously described and illustrated with reference to FIG. 2) of first switch 201 through communication link 304. File server 306 is communicatively coupled to another port of first switch 201 through communication link 308. Laptop computer 310 is communicatively coupled to a port of third switch 203 through communication link 312. Video camera 314 is communicatively coupled to a port of fourth switch 204 through communication link 316.

In this example, the inner ring (i.e., stacking links 212) of stack 200 is configured to carry traffic for a first VLAN, and the outer ring (i.e., stacking links 210) is configured to carry traffic for a second VLAN. In this example, laptop computer 310 and file server 306 belong to the second VLAN, and video camera 314 and video server 302 belong to the first VLAN. Third switch 203 is configured (e.g., via local configuration data 148 previously described and illustrated with reference to FIG. 2) to route traffic from laptop 312 on the second VLAN. Laptop computer 312 therefore uses the outer ring to access files from file server 306. Fourth switch 204 is configured to route traffic from video camera 314 on the first VLAN. Video camera 314 therefore uses the inner ring to archive video to video server 302.

By utilizing stack 200, traffic between laptop computer 312 and file server 306 will remain isolated from traffic between video camera 314 and video server 302. Therefore, even if video traffic saturates the available bandwidth on the inner ring, the ability of laptop computer 310 to access file server 306 will not be adversely impacted.

Figure 7:
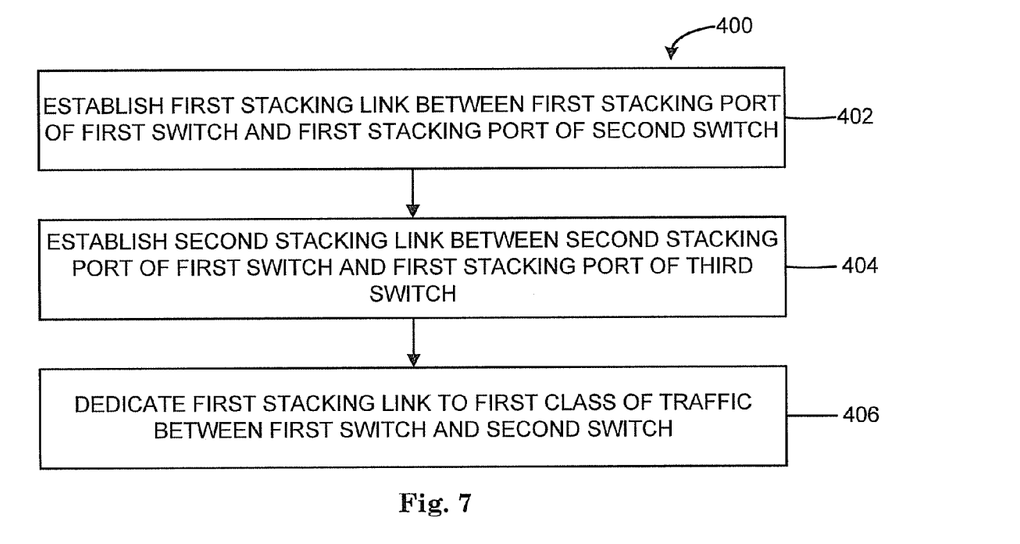
FIG. 7 is a flow diagram illustrating one example of a process for establishing a stack.

FIG. 7 is a flow diagram illustrating one example of a process 400 for establishing a stack, such as stack 200 previously described and illustrated with reference to FIG. 3 or stack 220(a) previously described and illustrated with reference to FIG. 4. At 402, a first stacking link between a first stacking port of a first switch and a first stacking port of a second switch is established. At 404, a second stacking link between a second stacking port of the first switch and a first stacking port of a third switch is established. At 406, the first stacking link is dedicated to a first class of traffic between the first switch and the second switch.

Figure 8:
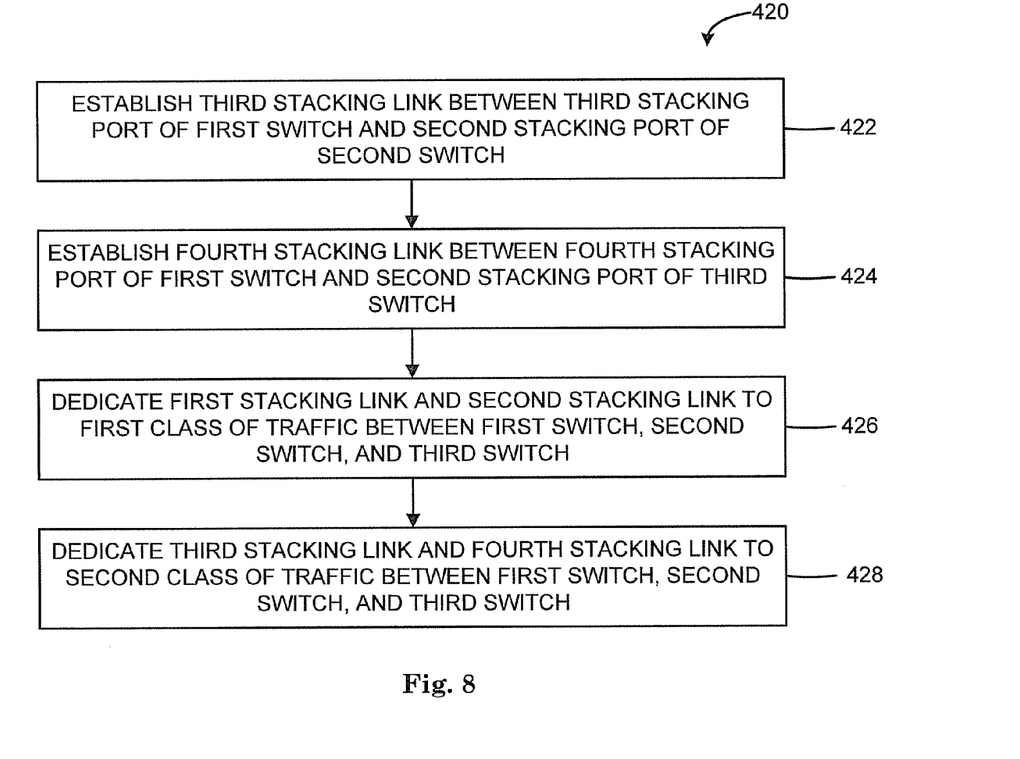
FIG. 8 is a flow diagram illustrating one example of a process for establishing a stack having a dual ring topology.

FIG. 8 is a flow diagram illustrating one example of a process 420 for establishing a stack having a dual ring topology, such as stack 200 previously described and illustrated with reference to FIG. 3. Process 420 begins after block 404 previously described and illustrated with reference to FIG. 7.

At 422, a third stacking link between a third stacking port of the first switch and a second stacking port of the second switch is established. At 424, a fourth stacking link between a fourth stacking port of the first switch and a second stacking port of the third switch is established. At 426, the first stacking link and the second stacking link are dedicated to a first class of traffic between the first switch, the second switch, and the third switch. At 428, the third stacking link and the fourth stacking link are dedicated to a second class of traffic between the first switch, the second switch, and the third switch.

Figure 9:
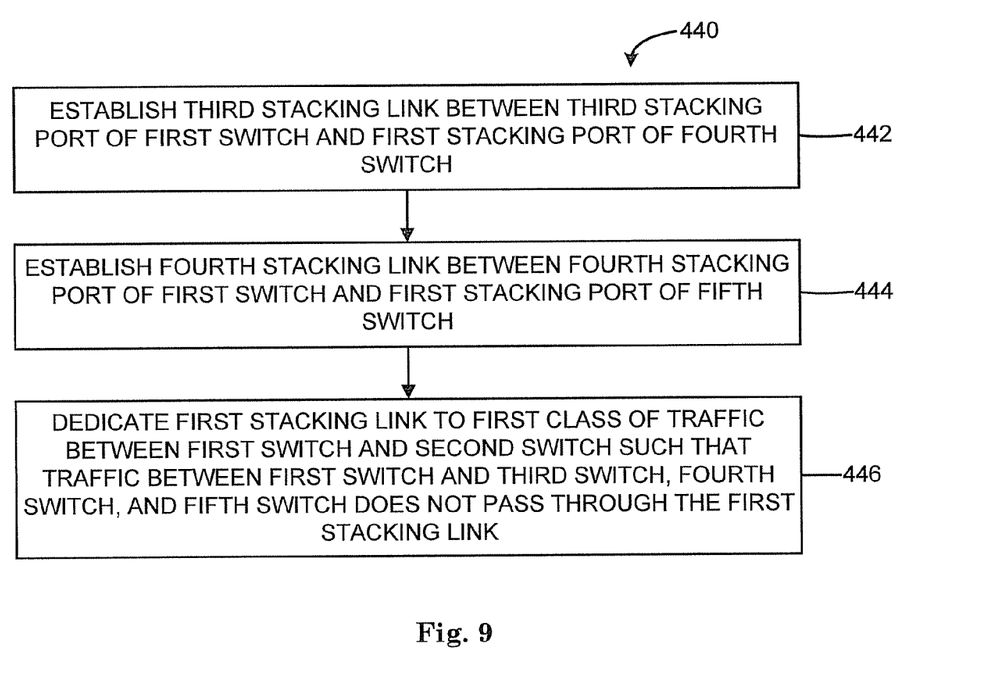
FIG. 9 is a flow diagram illustrating one example of a process for establishing a stack having a mesh topology.

FIG. 9 is a flow diagram illustrating one example of a process 440 for establishing a stack having a mesh topology, such as stack 220(a) previously described and illustrated with reference to FIG. 4. Process 440 begins after block 404 previously described and illustrated with reference to FIG. 7.

At 442, a third stacking link between a third stacking port of the first switch and a first stacking port of a fourth switch is established. At 444, a fourth stacking link between a fourth stacking port of the first switch and a first stacking port of a fifth switch is established. At 446, the first stacking link is dedicated to a first class of traffic between the first switch and the second switch such that traffic between the first switch and the third switch, the fourth switch, and the fifth switch does not pass through the first stacking link.

Examples of the stack enable a specific amount of inter-switch bandwidth to be dedicated for a particular use. In either a mesh topology or a dual ring topology, examples of the stack enable a specific amount inter-switch bandwidth to remain dedicated for a particular use even if one of the stacking links between the switches of the stack is broken. In addition, high security traffic can be dedicated to particular switch interconnects, thereby reducing the number of physical connections for which a user has to maintain physical security.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:
1. A first switch comprising:
a processor: and
a memory communicatively coupled to the processor, the memory storing instructions causing the processor, after execution of the instruction by the processor, to:
establish a first stacking link between a first stacking port of the first switch and a first stacking port of a second switch;

establish a second stacking link between a second stacking port of the first switch and a first stacking port of a third switch;
establish a third stacking link between a third stacking port of the first switch and a second stacking port of the second switch;
establish a fourth stacking link between a fourth stacking port of the first switch and a second stacking port of the third switch;
dedicate the first stacking link and the second stacking link to a first class of traffic between the first switch, the second switch, and the third switch; and
dedicate the third stacking link and the fourth stacking link to a second class of traffic between the first switch, the second switch, and the third switch.

2. The first switch of claim 1, wherein the first class of traffic between the first switch, the second switch, and the third switch comprises one of a particular Virtual Routing and Forwarding (VRF) instance, a particular set of ports, a particular Virtual Local Area Network (VLAN), a particular set of protocols, voice traffic, and video traffic, and
wherein the second class of traffic between the first switch, the second switch, and the third switch comprises another one of a particular VRF instance, a particular set of ports, a particular VLAN, a particular set of protocols, voice traffic, and video traffic.

3. A first switch comprising:
a processor; and
a memory communicatively coupled to the processor, the memory storing instructions causing the processor, after execution of the instruction by the processor, to:
establish a first stacking link between a first stacking port of the first switch and a first stacking port of a second switch;
establish a second stacking link between a second stacking port of the first switch and a first stacking port of a third switch;
establish a third stacking link between a third stacking port of the first switch and a first stacking port of a fourth switch;
establish a fourth stacking link between a fourth stacking port of the first switch and a first stacking port of a fifth switch; and
dedicate the first stacking link to the first class of traffic between the first switch and the second switch such that traffic between the first switch and the third switch, the fourth switch, and the fifth switch does not pass through the first stacking link.

4. The first switch of claim 3, wherein the first class of traffic between the first switch and the second switch comprises all traffic directly between the first switch and the second switch.

5. A method for establishing a stack of switches, the method comprising:
establishing a first stacking link between a first stacking port of a first switch and a first stacking port of a second switch;
establishing a second stacking link between a second stacking port of the first switch and a first stacking port of a third switch;
establishing a third stacking link between a third stacking port of the first switch and a second stacking port of the second switch;
establishing a fourth stacking link between a fourth stacking port of the first switch and a second stacking port of the third switch;
dedicating the first stacking link and the second stacking link to a first class of traffic between the first switch, the second switch, and the third switch; and
dedicating the third stacking link and the fourth stacking link to a second class of traffic between the first switch, the second switch, and the third switch.

6. A method for establishing a stack of switches, the method comprising:
establishing a first stacking link between a first stacking port of a first switch and a first stacking port of a second switch;
establishing a second stacking link between a second stacking port of the first switch and a first stacking port of a third switch;
establishing a third stacking link between a third stacking port of the first switch and a first stacking port of a fourth switch;
dedicating the first stacking link to a first class of traffic between the first switch and the second switch such that traffic between the first switch and the third switch and the fourth switch does not pass through the first stacking link; and
dedicating the second stacking link to a second class of traffic between the first switch and the third switch.

7. The method of claim 6, further comprising:
establishing a fourth stacking link between a fourth stacking port of the first switch and a first stacking port of a fifth switch; and
dedicating the first stacking link to the first class of traffic between the first switch and the second switch such that traffic between the first switch and the third switch, the fourth switch, and the fifth switch does not pass through the first stacking link.

* * * * *

UNITED STATES PATENT AND TRADEMARK OFFICE
CERTIFICATE OF CORRECTION

| | | |
|---|---|---|
| PATENT NO. | : 9,031,065 B2 | Page 1 of 1 |
| APPLICATION NO. | : 13/453373 | |
| DATED | : May 12, 2015 | |
| INVENTOR(S) | : Nick E. Demmon et al. | |

It is certified that error appears in the above-identified patent and that said Letters Patent is hereby corrected as shown below:

In the claims

In column 6, line 61, in Claim 1, delete "processor:" and insert -- processor; --, therefor.

Signed and Sealed this
Twentieth Day of October, 2015

Michelle K. Lee
*Director of the United States Patent and Trademark Office*